(12) United States Patent
Zimmermann et al.

(10) Patent No.: US 12,095,608 B2
(45) Date of Patent: Sep. 17, 2024

(54) PASSTHROUGH MODE CONTROL

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE SYSTEMS, INC., Fremont, CA (US)

( * ) Notice: Subject to any disclaimer, the term of this patent is extended or adjusted under 35 U.S.C. 154(b) by 117 days.

(21) Appl. No.: 17/739,189

(22) Filed: May 9, 2022

(65) Prior Publication Data

US 2022/0358066 A1 Nov. 10, 2022

Related U.S. Application Data

(60) Provisional application No. 63/186,766, filed on May 10, 2021.

(51) Int. Cl.
*H04L 41/0663* (2022.01)
*G06F 13/38* (2006.01)
*G06F 13/40* (2006.01)
*G06F 13/42* (2006.01)

(52) U.S. Cl.
CPC ........ *H04L 41/0663* (2013.01); *G06F 13/382* (2013.01); *G06F 13/385* (2013.01); *G06F 13/4004* (2013.01); *G06F 13/409* (2013.01); *G06F 13/4282* (2013.01); *G06F 2213/0042* (2013.01)

(58) Field of Classification Search
CPC ...................................................... G06F 21/57
See application file for complete search history.

(56) References Cited

U.S. PATENT DOCUMENTS

| 7,904,610 B2* | 3/2011 | Narayanan | G06F 13/387 |
| | | | 709/224 |
| 8,166,211 B2* | 4/2012 | Cota-Robles | G06F 9/468 |
| | | | 710/36 |

* cited by examiner

*Primary Examiner* — Henry Tsai
*Assistant Examiner* — Juanito C Borromeo
(74) *Attorney, Agent, or Firm* — HORIZON IP PTE LTD.

(57) ABSTRACT

System including at least one processor in communication with first and second port interfaces and one or more non-transitory computer-readable media. The first port interface may include a first communication port, and the second port interface may include a second communication port. The at least one processor is operative with the computer-readable program code to perform operations including setting the first and second port interfaces to passthrough mode by connecting the first port interface with the second port interface.

20 Claims, 5 Drawing Sheets

PASSTHROUGH MODE CONTROL

CROSS-REFERENCE TO RELATED APPLICATION

This application claims the benefit of U.S. Provisional Application No. 63/186,766, filed May 10, 2021 entitled "Universal Serial Bus (USB) Port Management Framework," which is hereby incorporated by reference in its entirety.

BACKGROUND

In data centers, the concentration of Information Technology ("IT") devices (e.g. virtual devices instantiated in combination with physical computing hardware and software such as: compute nodes, networking nodes, storage nodes, power nodes, and/or cooling nodes) may create a data center environment with significant overhead in tracking, configuring, clustering and managing IT device state(s). The IT devices may also have a multitude of interfaces, which may require a multitude of different IT device concentrator hardware units to physically connect to the IT devices. In some other data center environments, collocation environment or edge of the network point-of-presence may deploy a flexible number of same kind of IT devices or a flexible number of different kinds of IT devices, which may create a challenge on planning the right multitude of different IT device concentrator hardware units to physically connect to the IT devices. Some of the various techniques to work in such a cluttered environment may require a combination of device search tools, multiple IT device concentrator hardware units, management tools and/or many more additional supporting tools.

Additionally, various IT devices, such as IT devices by various vendors, may have different communication interfaces, network protocols, functions, user interfaces and application programmable interfaces (APIs), which may increase the difficulty of communicating with IT device(s). Deploying multiple devices, setting up consistent configurations and adding network functions on new or existing infrastructures is very time consuming and tedious. Networking teams typically spend a long time during evaluation, especially when numerous appliances are required.

An infrastructure management system may be used to facilitate management and configuration of these IT devices. An infrastructure management system may automatically perform an action on an IT device based at least in part, by an IT device information. There are several standard interfaces an IT device may use to communicate with the infrastructure management system. One type of standard interface is the Universal Serial Bus (USB). The USB is an industry standard that establishes specifications for cables, connectors and protocols for connection, communication and power supply (interfacing) between computers, peripherals and other computers. A broad variety of USB hardware exists, including different connector types, such as types A, B and C connectors.

DETAILED DESCRIPTION

Some of the various embodiments of the present invention relate to infrastructure management (IM) systems, and more particularly to an infrastructure management (IM) system configured to process network communication in an infrastructure. The infrastructure includes hardware and software components located in, for example, a data center, an edge network, a colocation and/or a remote branch. Various embodiments relate to an infrastructure configured to process network communication from infrastructure component(s) (e.g., IT devices) and employ the device information to determine an action to be performed on infrastructure component(s) in an infrastructure management system.

A device is a machine and/or component that may attach to a computer and/or computer network. Examples of devices include disk drives, printers, displays, mice, and modems. These particular devices may fall into a category of peripheral devices separate from a main computing device. Other example devices may be non-peripheral devices such as IT devices. Many devices, whether peripheral or not, may employ a program called a device driver that may act as a translator, converting general commands from an application into specific commands that the device understands.

An IT device is an "Information Technology" device related to computing technology, comprising, but not limited to: data center devices, networking devices, hardware devices, software operating in combination with a hardware IT device, Internet devices, and/or the like. Some IT devices may employ virtual devices operating on specially configured hardware. Additional examples of IT devices include servers, compute nodes, routers, switches, firewalls, load balancers, networking nodes, storage nodes, power nodes, cooling nodes, storage appliances, power appliances, cooling appliances, network appliances, virtual appliances, virtual machines, system hardware with network access, hosted module within a system, combinations thereof, and/or the like.

A virtual device may employ a software virtual device driver operating on a hardware computing device configured to emulate hardware and/or other devices so that multiple applications may, for example, access hardware interrupt channels, hardware resources and memory without causing conflicts. Computer hardware may require communication and control processes for devices and/or hardware components to access each other in a controlled manner. These processes may be defined as device drivers, which may comprise code that an application may employ to access hardware and/or external software resources. Some examples of virtual devices may be configured for use in multitasking operating systems. In such an example, a device driver may be controlled by an operating system's virtual device driver manager and shared by applications running within that kernel. A virtual device driver may pass interrupt and memory requests through the kernel, which in turn may allocate resources as required.

An agent may comprise a computer program that acts for a user or other program in a relationship of agency, which derives from the Latin agere (to do): an agreement to act on one's behalf. Such "action on behalf of" implies the authority to decide which, if any, action is appropriate. Some agents may comprise, but are not limited to: intelligent agents (in particular exhibiting some aspects of artificial intelligence, such as learning and reasoning), autonomous agents (capable of modifying the way in which the agent achieves objectives), distributed agents (being executed on physically distinct computers), multi-agent systems (distributed agents that do not have the capabilities to achieve an objective alone and thus must communicate), mobile agents (agents that can relocate their execution onto different processors), and/or the like.

Some of the various embodiments may communicate with virtual (in combination with configured hardware) and/or physical IT devices such as compute nodes, networking nodes, storage nodes, power nodes, cooling nodes, other IT devices, combinations thereof, and/or the like. An infrastructure management system may automatically perform an action on IT device(s)—based at least in part, by an IT device information. The nature of the interaction between infrastructure management system(s) and IT device(s) may be regulated by the type of device itself to dictate network protocols natively supported by the IT device(s). The type of IT device(s) may also be used to identify a class or type of action that may apply for IT device(s) available in a network.

One aspect of the present framework controls the passthrough mode of communication ports. A "passthrough mode" is a functional arrangement of a pair of first and second communication ports (e.g., USB ports) on, for example, an infrastructure management (IM) system, whereby an IT device (e.g., USB IT device) connected to the first communication port accesses a client device (e.g., USB client device) connected to the second communication port as if the client device is directly connected to the IT device. Each pair of communication ports may be independently configured to be connected directly (i.e., normal mode) or in passthrough (i.e., passthrough mode) to electrically connect the communication ports. By enabling normal mode or passthrough mode on the communication ports, a client device may be initially programmed via the normal mode, and then routed to an attached IT device via the passthrough mode. Additionally, during the normal mode, the IT device may be communicatively connected to the infrastructure management (IM) system for normal operation, such as console access via a USB connection. These and other exemplary features and advantages will be provided in more details herein.

Figure 1:
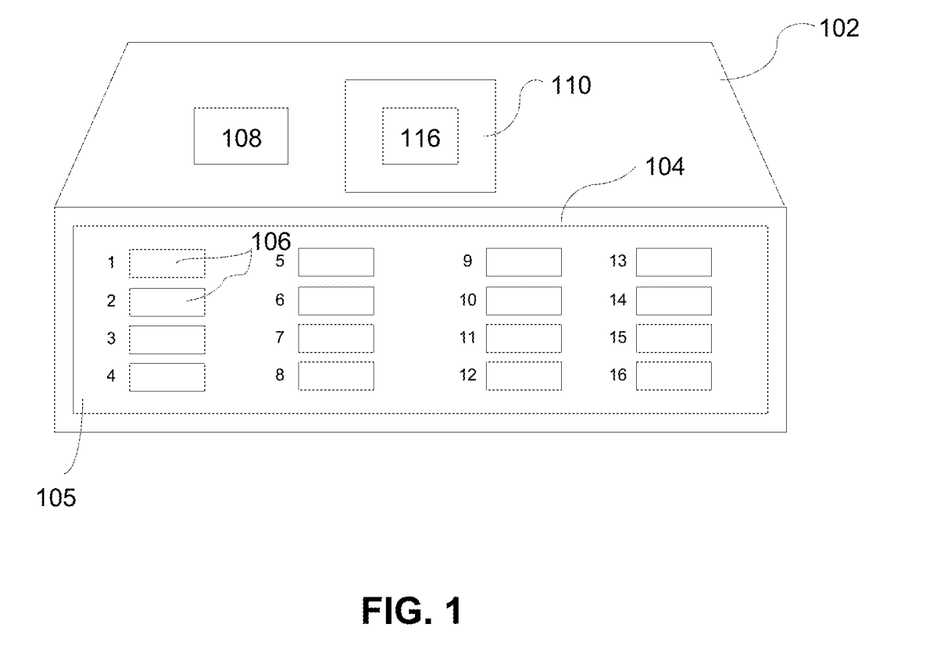
FIG. 1 shows an exemplary infrastructure management (IM) system.

FIG. 1 shows an exemplary infrastructure management (IM) system 102. The system 102 may be, for instance, a modular infrastructure management system that provides modular slots that receive communication card modules. Other types of IM systems are also useful. The IM system 102 may be employed in, for example, a data center, edge network, colocation and/or remote branch, to process network communication of one or more infrastructure components (e.g., IT devices). The IM system 102 may employ device information to determine an action to be performed on the one or more infrastructure components.

In some implementations, IM system 102 includes a housing 104. IM system 102 may be mounted on a rack or a desktop. Housing 104 may be configured to enclose at least one communication interface 105, one or more processors 108 and one or more non-transitory machine-readable media 110. Other components, such as a carrier I/O board to hold the processor board, an I/O interface, and additional peripheral controller(s) related to the I/O interface units, may also be enclosed by the housing 104.

The communication interface 105 includes at least one pair of communication ports 106 for sending data to and from one or more external IT devices. The at least one pair of communication ports 106 may include at least one pair of USB ports, serial ports, RS-232 serial ports, RS-485 serial ports, Local Area Network (LAN) ports, Wide Area Network Area (WAN) ports, a combination thereof and/or the like. The communication interface 105 may include, for example, a high number of USB ports 106 distributed on any one side of the housing 104 according to the space availability. The USB ports may be type A, type B, type C, or a combination thereof. As shown, the exemplary communication interface 105 includes a total of 16 USB ports 106 arranged in 4 rows. Other configurations or number of communication ports are also possible.

IM system 102 may be connectable to IT devices functioning as host devices (e.g., USB host devices) or client devices (e.g., USB client devices) via communication interface 105. A "host device", as used herein, generally refers to a device that can serve as a "master" device, to which other "client" peripherals can be attached. For example, IM system 102 may include USB ports that are connectable to a USB client device (e.g., storage device) and USB IT device functioning as host device (e.g., target IT device or USB console port).

One or more non-transitory computer-readable media 110 can be any available media that can be accessed by IM system 102 and includes both volatile and non-volatile media, and removable and non-removable media implemented in any method or technology for storage of information such as computer-readable instructions, data structures, program modules or other data. Computer-readable media 110 includes, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computer.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in non-transitory computer-readable media 110. In particular, the present techniques may be implemented by a passthrough control module 116.

A user may enter commands, configuration data and information into the IM system 102 through input devices such as a keyboard, a microphone, a camera, a touch screen, a console and a pointing device, such as a mouse, trackball or touch pad. These and other input devices are often connected to the one or more processors 108 through a user input interface, or indirectly connected via another IT device connected to the communication interface 105. A monitor, speaker or other type of output devices may also be connected via the communication interface 105.

Figure 2:
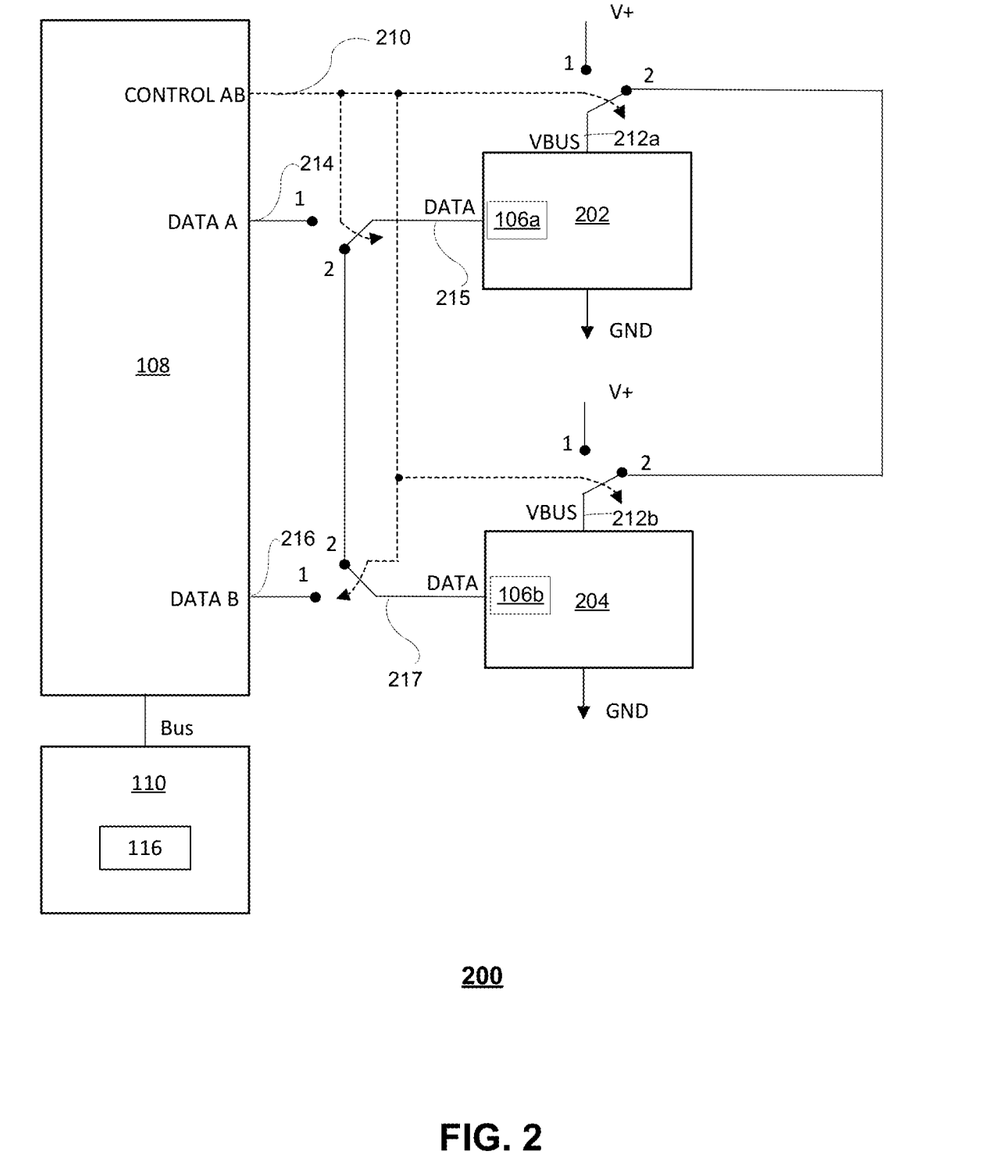
FIG. 2 shows an exemplary control system for passthrough mode control.

FIG. 2 shows an exemplary control system 200 for passthrough mode control. Control system 200 may be implemented within, for example, the housing 104 of infrastructure management (IM) system 102 of FIG. 1. Control system 200 includes at least one processor 108 coupled to one or more non-transitory computer-readable media 110, as well as first port interface 202 and second port interface 204.

It should be appreciated that additional port interfaces may be provided for additional communication ports. First port interface 202 provides a first communication port 106a (e.g., USB port), while second port interface 204 provides a second communication port 106b (e.g., USB port). Each port interface (202, 204) corresponds to a data output line of the at least one processor 108. First connections marked by "1" indicate connections that are enabled by switches during a normal mode, while second connections marked by "2" indicate connections that are enabled by switches during a passthrough mode.

The one or more non-transitory computer-readable media 110 includes a passthrough control module 116 for enabling a normal mode and a passthrough mode. When the passthrough control module 116 sets the first and second port interfaces (202, 204) to normal mode, the at least one processor 108 sends a control signal 210 to switch to the first connections to supply power from a power supply (V+) to the first and second power lines (212a, 212b) of the first and second port interfaces (202, 204). The first power line (e.g., VBus 212a) of the first port interface 202 is electrically disconnected from the second power line (e.g., VBus 212b) of the second port interface 204. Additionally, in response to the control signal 210, the first and second data lines (215, 217) of the first and second port interfaces (202, 204) are disconnected from each other, while first and second data outputs (214, 216) from the at least one processor 108 are connected to the first and second data lines (215, 217) respectively to allow data to be communicated between the processor 108 and the first and second port interfaces (202, 204).

When the passthrough control module 116 sets the first and second port interfaces (202, 204) to passthrough mode, the at least one processor 108 sends a control signal 210 to switch to second connections, wherein first power line (e.g., VBus 212a) of the first port interface 202 is electrically connected to second power line (e.g., VBus 212b) of the second port interface 204. The first and second power lines (212a-b) are disconnected from the power supply in response to the control signal 210. Further, first data line 215 of the first port interface 202 is electrically connected to second data line 217 of second port interface 204 in response to the control signal 210 to allow data to be communicated directly between first and second port interfaces (202, 204).

Figure 3:
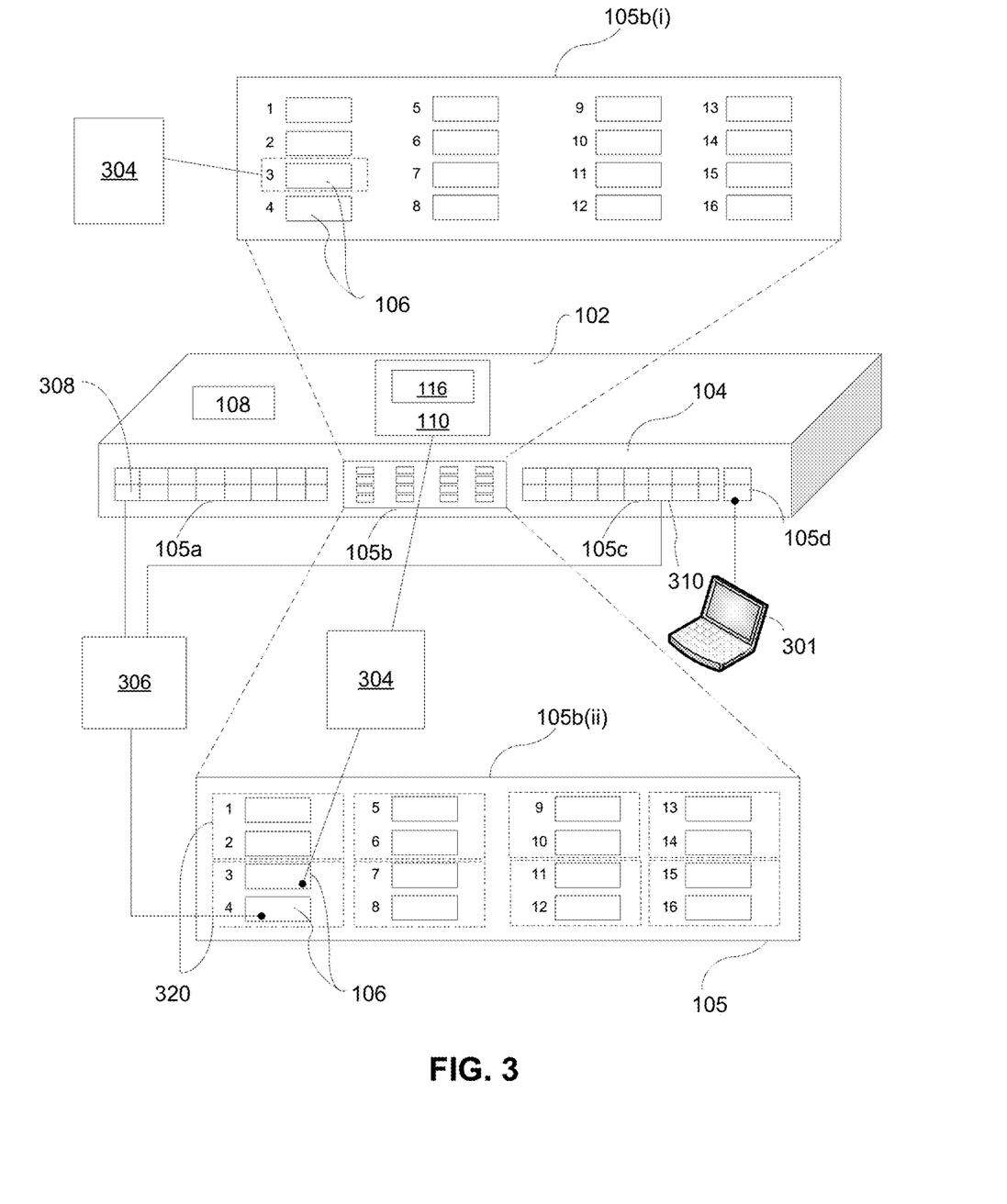
FIG. 3 shows an exemplary IM system with passthrough mode control.

FIG. 3 shows an exemplary infrastructure management (IM) system 102 with passthrough mode control. IM system 102 includes one or more processors 108 coupled to one or more non-transitory computer-readable media 110 and multiple communication interfaces (105a, 105b, 105c, 105d). Communication interface 105b provides at least first and second communication ports 106 (e.g., 16 USB ports). Other number of ports or types of ports may also be provided. Communication interface 105b may include first and second port interfaces (202, 204) corresponding to first and second communication ports (106a-b) for switching between normal and passthrough modes, as previously shown in FIG. 2.

Communication interface 105b may operate in normal mode (shown as 105b(i)) or passthrough mode (shown as 105b(ii)). For purposes of illustration, communication interface 105b(i) is operating in normal mode, while communication interface 105b(ii) is operating in passthrough mode.

During the normal mode, each of the first and second communication ports 106 of the communication interface 105b(i) functions as a normal USB host. As previously described, in response to the control signal 210 provided by the processor 108, first and second data lines (215, 217) of the first and second communication ports 106 are disconnected from each other, while first and second data outputs (214, 216) from the processor 108 are connected to the first and second data lines (215, 217) respectively. An IT device (e.g., USB storage device) 304 may be communicatively coupled to a communication port 106 and detected by the processor 108. A user may then access the IT device 304 via the IM system 102 to format, copy and/or read files. For instance, the user may transfer a file (e.g., a bootable image of a client device or target IT device 306) from non-transitory media 110 to the IT device 304. This file may be previously stored on the one or more non-transitory media 110, or transferred (e.g., over a network) to the non-transitory media 110 from a remote client device 301.

During passthrough mode, each pair 320 of first and second communication ports 106 of the communication interface 105b(ii) may be independently configured to be in "passthrough." Each pair 320 is delineated by broken lines for illustration purposes, and includes first and second communication ports (e.g., 1 and 2, 3 and 4, 5 and 6). Each pair of first and second communication ports corresponds to a pair of first and second port interfaces (202, 204), as previously described with respect to FIG. 2. The signals at the pair 320 of first and second communication ports 106 are electrically connected, as if there is an internal cable connecting the two ports. More particularly, first data line 215 of the first communication port (or first port interface 202) is electrically connected to second data line 217 of the second communication port (or second port interface 204) in response to the control signal 210 to allow data to be communicated directly between first and second communication ports. Additionally, first power line (e.g., VBus 212a) of the first communication port (or first port interface 202) is electrically connected to second power line (e.g., VBus 212b) of the second communication port (or second port interface 204). The first and second power lines (212a-b) are disconnected from the power supply in response to the control signal 210.

As an example, if a storage device 304 is coupled to first communication port 3 and a cable from a target IT device 306 is coupled to second communication port 4, the target IT device 306 may access the storage device 304 as if it is connected directly to the target IT device 306. The passthrough mode may be configured by passthrough control module 116 using the control system 200, as previously described with respect to FIG. 2.

The normal and passthrough modes are useful when a user is programming an IT device 304, such as a USB storage device. For example, during normal mode, a storage device 304 coupled to the IM system 102 via a first USB port (e.g., port 3) of communication interface 105b(i) may be initially programmed using data stored locally in the one or more non-transitory tangible computer-readable media 110. Passthrough mode may be enabled to route the storage device 304 to a remote USB target IT device 306 coupled to the IM system 102 via a second USB port (e.g., port 4) of communication interface 105b(ii). The target IT device 306 may further be coupled to the IM system 102 via a network (e.g., Ethernet) management port 308, a serial console port 310, other communication port, or a combination thereof. This enables further configuration of the target IT device 306. One example is to access the BIOS of the target IT device 306 via the serial console port 310 and configure the target IT device 306 to boot directly from new firmware (or file) stored on the storage device 304, which is available via passthrough mode.

Figure 4:
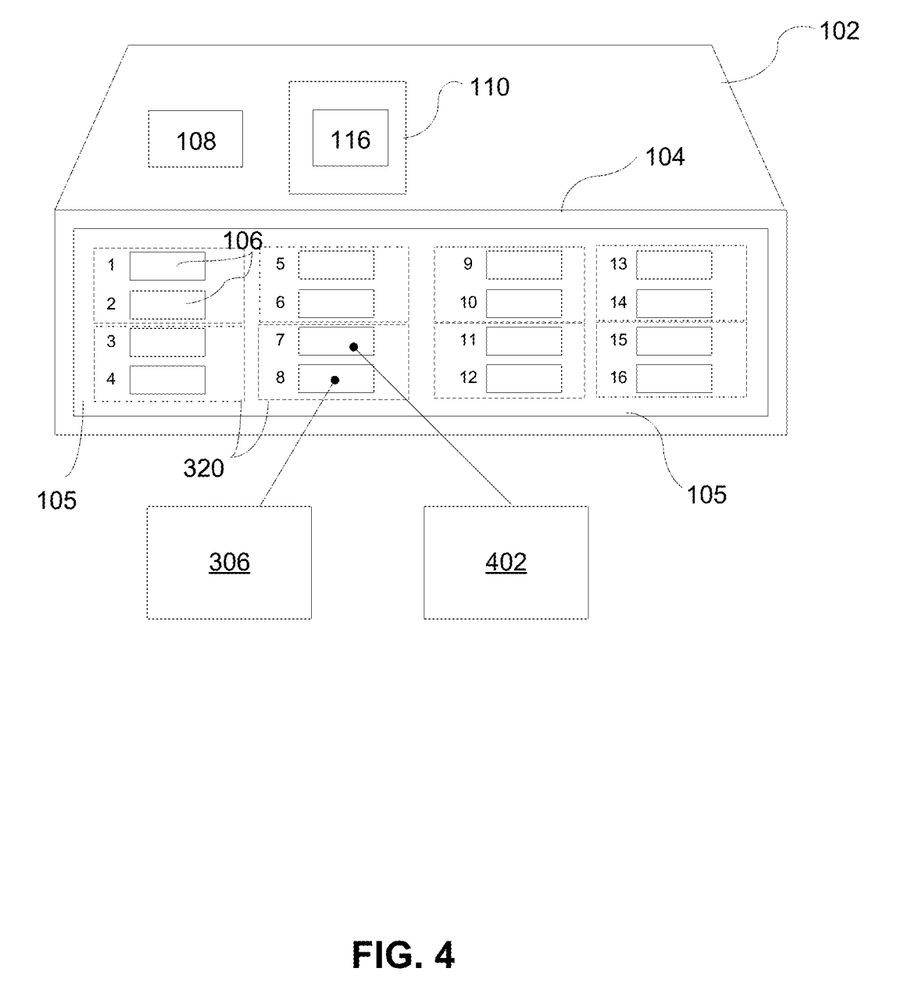
FIG. 4 shows another exemplary IM system with passthrough mode control.

FIG. 4 shows another exemplary infrastructure management (IM) system 102 with passthrough mode control. In some implementations, the communication interface 105 serves as an 8-port card with a dedicated storage device for each port. More particularly, each pair 320 of communication ports includes a first communication port (e.g., port 7) coupled to a storage device 402 (e.g., 16 GB USB storage device) and a second communication port (e.g., port 8) that can be coupled to a target IT device 306. Although only one storage device 402 and only one target IT device 306 are shown, it should be appreciated that more than one storage device 402 and more than one target IT device 306 may be provided for the other pairs of communication ports. Passthrough mode of each pair of communication ports may be controlled independently. For example, one pair of communication ports may be set to passthrough mode while another pair of communication ports is set to normal mode.

Multiple versions of bootable firmware (or files) may be stored in the one or more non-transitory computer-readable media 110 and transferred (e.g., via network) to the storage device 402. When the passthrough mode is enabled for the pair 320 of communication ports, the target IT device 306 may access and boot directly from the respective storage device 402 in its pair 320.

Figure 5:
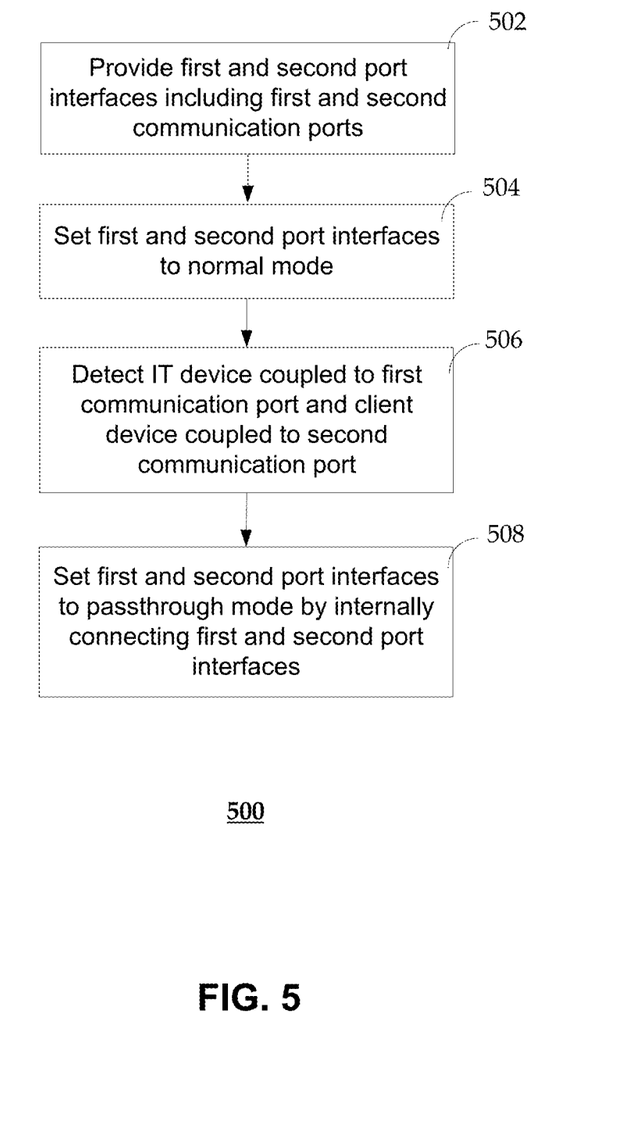
FIG. 5 shows an exemplary method of controlling passthrough mode.

FIG. 5 shows an exemplary method 500 of controlling passthrough mode. It should be understood that the steps of the method 500 may be performed in the order shown or a different order. Additional, different, or fewer steps may also be provided. Further, the method 500 may be implemented with the IM system 102 of FIGS. 1, 3 and 4, control system 200 of FIG. 2, a different system, or a combination thereof.

At 502, first and second port interfaces (202, 204) are provided. As discussed previously, first and second port interfaces (202, 204) may be implemented on infrastructure management (IM) system 102. First and second port interfaces (202, 204) provide first and second communication ports (e.g., USB ports) (106a-b).

At 504, passthrough control module 116 sets the first and second port interfaces (202, 204) to normal (or USB host) mode. Passthrough control module 116 may set the first and second port interface (202, 204) to the normal mode using control system 200, as previously described with respect to FIG. 2. For example, processor 108 may send a control signal that causes first and second data lines of the first and second port interfaces (202, 204) to be disconnected from each other, while first and second data outputs (214, 216) from the at least one processor 108 are connected to the first and second data lines (215, 217) respectively to allow data to be communicated between the processor 108 and the first and second port interfaces (202, 204). The first and second power lines (212a, 212b) of the first and second port interfaces (202, 204) receives power from a power supply (V+) in response to the control signal. Additionally, the first power line (e.g., VBus 212a) of the first port interface 202 is electrically disconnected from the second power line (e.g., VBus 212b) of the second port interface 204.

Passthrough control module 116 may set the first and second port interfaces (202, 204) to normal mode in accordance with configuration data stored in, for example, non-transitory computer-readable media 110. In some implementations, the configuration data is provided by and/or modified by an administration user connected to the IM system 102 via, for example, a user interface. Alternatively, the configuration data is provided and/or modified by an application program interface (API) either programmatically or in response to a change of status or event.

At 506, an IT device 304 coupled to the first communication port 106a and a client device 306 coupled to second communication port 106b are detected. The IT device 304 may be, for example, a USB storage device that is physically coupled to the first communication port 106a directly or using a USB cable. Other types of IT devices, such as USB peripheral device (e.g., keyboard, mouse), USB compact disc (CD) read-only memory (ROM) drive and/or USB video camera, are also possible. Client device 306 may be, for example, a target IT device. Client device 306 may be physically coupled to the second communication port 106b by, for example, a USB cable. IT device 304 and client device 306 may be detected by, for example, device drivers installed in the operating system (OS).

At 508, passthrough control module 116 sets the first and second port interfaces (202, 204) to passthrough mode. Passthrough control module 116 may set the first and second port interface (202, 204) to passthrough mode using control system 200, as previously described with respect to FIG. 2. In some implementations, the passthrough mode is set by internally connecting the first and second port interfaces (202, 204) to communicate data and power. The internal connection may be made in response to the processor 108 sending a control signal 210 that switches the connections to internally connect first data line 215 of the first port interface 202 to second data line 217 of the second port interface 204 to allow data to be communicated directly between first and second port interfaces (202, 204). First power line (e.g., VBus 212a) of the first port interface 202 is also connected to the second power line (e.g., VBus 212b) of the second port interface 204 in response to the control signal 210. The IT device 304 and the client device 306 may then exchange data and power via the direct internal connections.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

What is claimed is:

1. An infrastructure management system, comprising:
   a communication interface including first and second universal serial bus (USB) ports;
   one or more non-transitory computer-readable media for storing computer-readable program code; and
   at least one processor in communication with the first and second USB ports and the one or more non-transitory computer-readable media, wherein the at least one processor is operative with the computer-readable program code to perform operations including
      setting the first and second USB ports to operate in passthrough mode by electrically connecting first data line of the first USB port to second data line of the second USB port and electrically connecting first power line of the first USB port to second power line of the second USB port.

2. The infrastructure management system of claim 1 wherein the first USB port is connected to a USB information technology (IT) device and the second USB port is connected to a USB client device.

3. The infrastructure management system of claim 2 wherein the USB IT device comprises a storage device and the USB client device comprises a target IT device.

4. The infrastructure management system of claim 3 wherein the target IT device boots directly from a file stored on the storage device.

5. The infrastructure management system of claim 1 wherein the at least one processor is operative with the computer-readable program code to set the first and second USB ports to operate in normal mode by disconnecting the first data line from the second data line and disconnecting the first power line from the second power line.

6. A control system, comprising:
 first and second port interfaces, wherein the first port interface includes a first communication port and the second port interface includes a second communication port;
 one or more non-transitory computer-readable media for storing computer-readable program code; and
 at least one processor in communication with the first and second port interfaces and the one or more non-transitory computer-readable media, wherein the at least one processor is operative with the computer-readable program code to perform operations including setting the first and second port interfaces to passthrough mode by electrically connecting the first port interface with the second port interface.

7. The control system of claim 6 wherein the at least one processor is operative with the computer-readable program code to connect the first port interface with the second port interface by sending a control signal to switch to first connections.

8. The control system of claim 7 wherein first data line of the first port interface is connected to second data line of the second port interface in response to the control signal.

9. The control system of claim 7 wherein first power line of the first port interface is connected to second power line of the second port interface in response to the control signal.

10. The control system of claim 9 wherein the first and second power lines are disconnected from a power supply in response to the control signal.

11. The control system of claim 6 wherein the at least one processor is operative with the computer-readable program code to further set the first and second port interfaces to normal mode by disconnecting the first port interface from the second port interface.

12. The control system of claim 11 wherein the at least one processor is operative with the computer-readable program code to disconnect the first port interface from the second port interface by sending a control signal to switch to second connections.

13. The control system of claim 12 wherein first data line of the first port interface is disconnected from second data line of the second port interface in response to the control signal.

14. The control system of claim 13 wherein the first and second data lines of the first and second port interfaces are connected to first and second data outputs from the at least one processor in response to the control signal.

15. The control system of claim 12 wherein first power line of the first port interface is disconnected from second power line of the second port interface in response to the control signal.

16. The control system of claim 15 wherein the first and second power lines are connected to a power supply in response to the control signal.

17. The control system of claim 6 wherein the first and second communication ports are USB ports.

18. A method of controlling passthrough mode, comprising:
 providing first and second port interfaces, wherein the first port interface includes a first communication port and the second port interface includes a second communication port;
 setting the first and second port interfaces to normal mode by sending a first control signal that causes first data line of the first port interface to be electrically disconnected from second data line of the second port interface and first power line of the first port interface to be electrically disconnected from second power line of the second port interface; and
 setting the first and second port interfaces to passthrough mode by sending a second control signal that causes the first data line of the first port interface to be electrically connected to the second data line of the second port interface and the first power line of the first port interface to be electrically connected to the second power line of the second port interface.

19. The method of claim 18 further comprises detecting an IT device coupled to the first communication port and a client device coupled to second communication port.

20. The method of claim 18 wherein setting the first and second port interfaces to the passthrough mode further comprises connecting first power line of the first port interface to second power line of the second port interface.

* * * * *